(12) United States Patent
Grocutt

(10) Patent No.: US 11,269,649 B2
(45) Date of Patent: Mar. 8, 2022

(54) RESUMING BEATS OF PROCESSING OF A SUSPENDED VECTOR INSTRUCTION BASED ON BEAT STATUS INFORMATION INDICATING COMPLETED BEATS

(71) Applicant: ARM LIMITED, Cambridge (GB)

(72) Inventor: Thomas Christopher Grocutt, Cambridge (GB)

(73) Assignee: ARM LIMITED, Cambridge (GB)

(*) Notice: Subject to any disclaimer, the term of this patent is extended or adjusted under 35 U.S.C. 154(b) by 0 days.

(21) Appl. No.: 16/078,780

(22) PCT Filed: Mar. 17, 2017

(86) PCT No.: PCT/GB2017/050736
§ 371 (c)(1),
(2) Date: Aug. 22, 2018

(87) PCT Pub. No.: WO2017/163023
PCT Pub. Date: Sep. 28, 2017

(65) Prior Publication Data
US 2019/0056933 A1 Feb. 21, 2019

(30) Foreign Application Priority Data
Mar. 23, 2016 (GB) .................................... 1604944

(51) Int. Cl.
*G06F 9/30* (2018.01)
*G06F 9/38* (2018.01)
*G06F 9/34* (2018.01)

(52) U.S. Cl.
CPC ........ *G06F 9/3861* (2013.01); *G06F 9/30101* (2013.01); *G06F 9/34* (2013.01)

(58) Field of Classification Search
CPC ...... G06F 9/30101; G06F 9/34; G06F 9/3861; G06F 9/30036
See application file for complete search history.

(56) References Cited

U.S. PATENT DOCUMENTS 4,782,441 A 11/1988 Inagami et al.
5,008,812 A 4/1991 Bhandarkar
(Continued)

FOREIGN PATENT DOCUMENTS

EP 0 205 809 12/1986
EP 0 333 365 9/1989
(Continued)

OTHER PUBLICATIONS

IBM Technical Disclosure Bulletin NN8206121, "Interruption Scheme for Vector Instructions", Jun. 1, 1982, pp. 121-123.*
(Continued)

*Primary Examiner* — David J. Huisman
(74) *Attorney, Agent, or Firm* — Nixon & Vanderhye, P.C.

(57) ABSTRACT

Processing circuitry performs multiple beats of processing in response to a vector instruction, each beat comprising processing corresponding to a portion of a vector value comprising multiple data elements. The processing circuitry sets beat status information indicating which beats of a group of two or more vector instructions have completed. In response to a return-from-event request indicating a return to processing of a given vector instruction, the processing circuitry resumes processing of the group of uncompleted vector instructions while suppressing beats already completed, based on the beat status information.

20 Claims, 10 Drawing Sheets

(56) References Cited

U.S. PATENT DOCUMENTS

| | | | |
|---|---|---|---|
| 5,113,521 A | 5/1992 | McKeen | |
| 5,623,650 A | 4/1997 | Beard | |
| 6,317,819 B1 | 11/2001 | Morton | |
| 6,530,011 B1 | 3/2003 | Choquette | |
| 7,043,616 B1 * | 5/2006 | McGrath | G06F 9/30101 711/163 |
| 9,804,844 B2 * | 10/2017 | Ould-Ahmed-Vall | G06F 9/30185 |
| 2002/0032848 A1 | 3/2002 | Liao | |
| 2003/0221086 A1 | 11/2003 | Simovich | |
| 2006/0149941 A1 | 7/2006 | Colavin | |
| 2009/0213128 A1 | 8/2009 | Chen | |
| 2012/0054877 A1 * | 3/2012 | Rosu | G06F 9/545 726/30 |
| 2012/0216011 A1 * | 8/2012 | Gove | G06F 15/8053 712/7 |
| 2012/0260061 A1 | 10/2012 | Reid | |
| 2013/0212700 A1 * | 8/2013 | Grocutt | G06F 21/606 726/27 |
| 2014/0344553 A1 | 11/2014 | Hughes et al. | |
| 2015/0154026 A1 | 6/2015 | Park | |
| 2016/0378478 A1 | 12/2016 | Gschwind | |
| 2017/0060579 A1 | 3/2017 | Vincent | |

FOREIGN PATENT DOCUMENTS

| | | |
|---|---|---|
| GB | 2 339 623 | 2/2000 |
| KR | 10-2004-0007562 A | 1/2004 |
| KR | 10-2015-0079809 | 7/2015 |
| KR | 10-2015-0137129 | 12/2015 |
| TW | 188882 | 8/1992 |
| WO | 2005/114441 | 12/2005 |

OTHER PUBLICATIONS

Office Action dated Jun. 13, 2019 in co-pending U.S. Appl. No. 15/078,149, 30 pages).
International Search Report and Written Opinion of the ISA for PCT/GB2017/050736, dated May 23, 2017, 17 pages.
Combined Search and Examination Report for GB 1604944.7, dated Aug. 19, 2016, 10 pages.
Examination Report for GB 1604944,7, dated Feb. 28, 2018, 3 pages.
Liles et al. "Interruption Scheme for Vector Instructions" IBM Technical Bulletin 06-82, published Jun. 1, 1982, 3 pages.
U.S. Appl. No. 15/078,149, filed Mar. 23, 2016, Grocutt.
Advisory Action dated Nov. 9, 2018 in co-pending U.S. Appl. No. 15/078,149.
European Patent Office Action dated Apr. 16, 2021 in EP Application No. 17713390.7, 13 pages.
Search Report for Taiwan Invention Patent Application No. 106109458 filed Mar. 22, 2017, with English translation, 25 pages.
Korean Office Action dated Jun. 21, 2021 for Application 10-2018-7029665, with corresponding English translation, 6 pages.
Korean Notice of Allowance for Application No. 10-2018-7029665 dated Dec. 30, 2021, with English language summary, 3 pages.

* cited by examiner

| beat status information | completed beats |
|---|---|
| 0000 | Inactive |
| 0001 | A1 |
| 0010 | A1 A2 |
| 0011 | A1 A2 B1 |
| 0100 | A1 A2 A3 |
| 0101 | A1 A2 A3 B1 |
| 0110 | A1 A2 A3 B1 B2 |
| 0111 | A1 A2 A3 B1 B2 C1 |
| 1XXX | RESERVED |
$Ax = x^{th}$ beat of oldest uncompleted instruction
$Bx = x^{th}$ beat of next vector instruction after A
$Cx = x^{th}$ beat of next vector instruction after B
FIG. 5
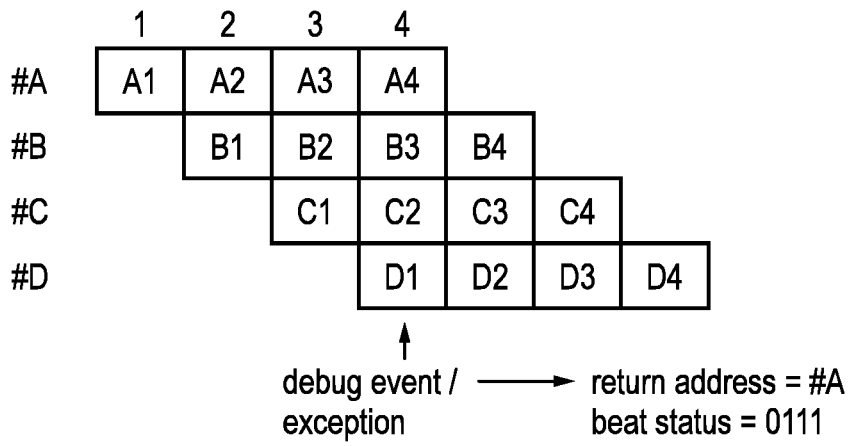
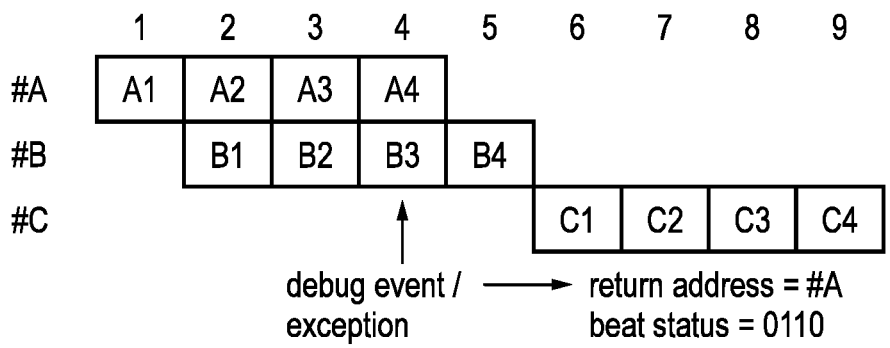
FIG. 6

RESUMING BEATS OF PROCESSING OF A SUSPENDED VECTOR INSTRUCTION BASED ON BEAT STATUS INFORMATION INDICATING COMPLETED BEATS

The present technique relates to the field of data processing. More particularly, it relates to the processing of vector instructions. Some data processing systems support processing of vector instructions for which a source operand or result value of the instruction is a vector comprising multiple data elements. By supporting the processing of a number of distinct data elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

At least some examples provide an apparatus comprising:
processing circuitry to process vector instructions for which at least one of a source operand and a result value is a vector value comprising a plurality of data elements, wherein:
in response to a given vector instruction, the processing circuitry is configured to perform a plurality of beats of processing, each beat comprising processing corresponding to a portion of the vector value;
the processing circuitry is configured to set beat status information indicative of which beats of a plurality of vector instructions including said given vector instruction have completed; and
in response to an event, the processing circuitry is configured to suspend processing of said given vector instruction;
in response to a return-from-event request indicating a return to processing of one of said plurality of vector instructions, the processing circuitry is configured to resume processing of said plurality of vector instructions while suppressing the beats of said plurality of vector instructions indicated by said beat status information as having completed;
the vector value comprises data elements having one of a plurality of data element sizes specified by data element size information accessible to the processing circuitry; and
each beat of processing comprises processing corresponding to a fixed size portion of the vector value, irrespective of the data element size indicated by said data element size information.

At least some examples provide a method of processing vector instructions for which at least one of a source operand and a result value is a vector value comprising a plurality of data elements; the method comprising:
in response to a given vector instruction, performing a plurality of beats of processing, each beat comprising processing corresponding to a portion of the vector value;
setting beat status information indicative of which beats of a plurality of vector instructions including said given vector instruction have completed; and
in response to an event, suspending processing of said given vector instruction; and
in response to a return-from-event request indicating a return to processing of one of said plurality of vector instructions, resuming processing of said plurality of vector instructions while suppressing the beats of said plurality of vector instructions indicated by said beat status information as having completed;
wherein the vector value comprises data elements having one of a plurality of data element sizes specified by data element size information; and each beat of processing comprises processing corresponding to a fixed size portion of the vector value, irrespective of the data element size indicated by said data element size information.

At least some examples provide a virtual machine computer program comprising program instructions to control a host data processing apparatus to provide an instruction execution environment corresponding to the apparatus discussed above.

A computer-readable storage medium storing the virtual machine computer program can also be provided. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus supporting processing of vector instructions;

FIG. 5 shows an example encoding for beat status information for indicating which beats of a block of multiple vector instructions have completed;

FIG. 6 shows two examples of recording beat status information on the occurrence of a debug event or exception;

Figure 1:
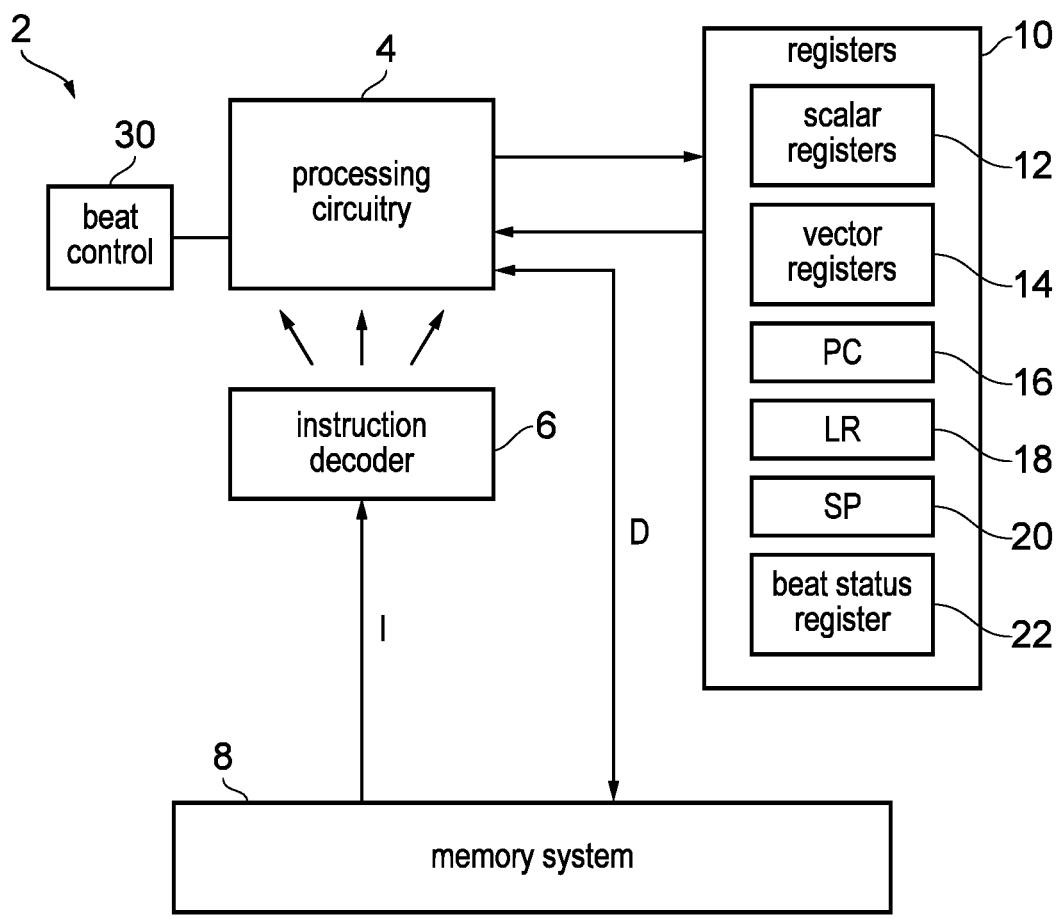

Some specific examples will be described below. It will be appreciated that the present technique is not limited to these exact examples.

Software written in accordance with a given instruction set architecture can be executed on a range of different data processing apparatuses having different hardware implementations. As long as a given set of instructions when executed gives the results expected by the architecture, then a particular implementation is free to vary its micro-architectural design in any way which achieves this architecture compliance. For example, for some applications, energy efficiency may be more important than performance and so the micro-architectural design of processing circuitry provided for executing instructions from the instruction set architecture may be designed to consume as little energy as possible even if this is at the expense of performance. Other applications may see performance as a more important criterion than energy efficiency and so may include more complex hardware structures which enable greater throughput of instructions, but which may consume more power. Hence, it can be desirable to design the instruction set architecture so that it supports scaling across a range of different energy or performance points.

Some instruction set architectures support vector instructions for triggering processing circuitry to perform processing for which either a source operand or a result value (or both) is a vector comprising multiple data elements. Some micro-architectural implementations may process all of the elements of a vector in parallel, while other implementations may process the vector a portion at a time.

During processing of a given thread of instruction execution, sometimes a certain event may be detected which triggers suspension of a given vector instruction of the current thread so that the processing circuitry can perform some other type of processing. For example, the event could be a debug event which triggers switching to a debug state in which an external debugger can inspect the operation of the processing circuitry (either by injecting debug instructions to be executed by the processing circuitry to read out internal resources such as register state, or by directly accessing internal resources of the processing circuitry from the external debugger), or an exception event indicating that an error, fault or external event has occurred. Some such events may be performance critical in that it may be important to respond to the event as soon as possible. Following handling of the event, a return-from-event request (e.g. an exception return or return from the debug state) may then trigger a return to the processing being performed before the event occurred.

The processing circuitry described in this application is configured to process a vector instruction by performing a number of beats of processing with each beat comprising processing corresponding to a portion of a vector value. The data processing circuitry is configured to set beat status information indicating which beats of a group of two or more vector instructions have completed. In response to a return-from-event request indicating a return to processing of the given vector instruction, the processing circuitry uses the beat status information to determine which beats have already completed, and suppresses the beats of a group of two or more instructions indicated by the beat status information as already completed. A given beat of a given vector instruction can be suppressed, for example, by not performing the processing operation associated with that beat at all, or by masking writing of the result of that processing operation to a register or other storage location.

This arrangement enables a processing architecture supporting vector instructions to scale more efficiently to different performance and energy points. By providing beat status information which tracks the completed beats of two or more vector instructions, this gives freedom for a particular micro-architectural implementation to vary the amount by which execution of different vector instructions is overlapped, so that it is possible to perform respective beats of different vector instructions in parallel with each other while still tracking the progress of each partially executed instruction. Some micro-architectural implementations may choose not to overlap execution of respective vector instructions at all, so that all the beats of one vector instruction are completed before the next instruction starts. Other micro-architectures may stagger the execution of consecutive vector instructions so that a first subset of beats of a second vector instruction is performed in parallel with a second subset of beats from the first vector instruction.

Regardless of the particular way in which a given hardware implementation chooses to implement the execution of the vector instructions, by defining the beat status information, it is possible to respond more quickly to an event suspending a thread of instruction execution, because it is not necessary to wait for a given vector instruction to complete all its beats before suspending the thread since the beat status information enables the partially completed instructions to resume after handling of the event. This behaviour may also be important for handling exceptions which are precise faults, where architecturally the instruction cannot complete its execution. Often, exception response latency can be more important than reducing the latency when resuming processing following the exception. Therefore, this approach can provide advantages for exception handling.

In contrast, an approach which only records information about the progress of a single instruction, or which assumes that a particular combination of beats of a group of instructions would have completed at the point of suspension of the thread of execution would provide less flexibility for micro-architectural hardware designers to scale the amount of overlap of different vector instructions. Another alternative approach would be to store results of completed beats of partially executed instructions as speculative state which is not committed until the entire instruction completes, but this would require additional storage and control overhead which would be undesirable for lower-power implementations. By providing beat status information which indicates which particular beats of multiple vector instructions have completed, and using this to resume processing at the appropriate point, the instruction set architecture can be much more flexible to help improve performance and energy efficiency across a range of different micro-architectures, without needing to manage speculative state.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example the decoder 6 may interpret the opcodes of the decoded instructions and any additional control fields of the instructions to generate control signals which cause a processing circuitry 4 to activate appropriate hardware units to perform operations such as arithmetic operations, load/store operations or logical operations. The apparatus has a set of registers 10 for storing data values to be processed by the processing circuitry 4 and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing circuitry. The memory system 8 may include one or more levels of cache as well as main memory.

The registers 10 include a scalar register file 12 comprising a number of scalar registers for storing scalar values which comprise a single data element. Some instructions supported by the instructions decoder 6 and processing circuitry 4 are scalar instructions which process scalar operands read from scalar registers 12 to generate a scalar result written back to a scalar register.

The registers 10 also include a vector register file 14 which includes a number of vector registers each for storing a vector value comprising multiple data elements. In response to a vector instruction, the instruction decoder 6 controls the processing circuitry 4 to perform a number of lanes of vector processing on respective elements of a vector operand read from one of the vector registers 14, to generate either a scalar result to be written to the scalar registers 12 or a further vector result to be written to a vector register 14. Some vector instructions may generate a vector result from one or more scalar operands, or may perform an additional scalar operation on a scalar operand in the scalar register file as well as lanes of vector processing on vector operands read from the vector register file 14. Hence, some instructions may be mixed-scalar-vector instructions for which at least one of one or more source registers and a destination register of the instruction is a vector register 14 and another of the one or more source registers and the destination register is a scalar register 12. Vector instructions may also include vector load/store instructions which cause data values to be transferred between the vector registers 14 and locations in the memory system 8. The load/store instructions may include contiguous vector load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or store data from respective elements of a vector register to the discrete addresses.

The processing circuitry 4 may support processing of vectors with a range of different data element sizes. For example a 128-bit vector register 14 could be partitioned into sixteen 8-bit data elements, eight 16-bit data elements, four 32-bit data elements or two 64-bit data elements for example. A control register within the register bank 10 may specify the current data element size being used, or alternatively this may be a parameter of a given vector instruction to be executed.

The registers 10 also include a number of control registers for controlling processing of the processing circuitry 4. For example these may include a program counter register 16 for storing a program counter address which indicates an address of an instruction corresponding to a current execution point being processed, a link register 18 for storing a return address to which processing is to be directed following handling of a function call, a stack pointer register 20 indicating the location within the memory system 8 of a stack data structure, and a beat status register 22 for storing beat status information which will be described in more detail below. It will be appreciated that these are just some of the types of control information which could be stored, and in practice a given instruction set of architecture may store many other control parameters as defined by the architecture. For example, a control register may specify the overall width of a vector register, or the current data element size being used for a given instance of vector processing.

Figure 13:
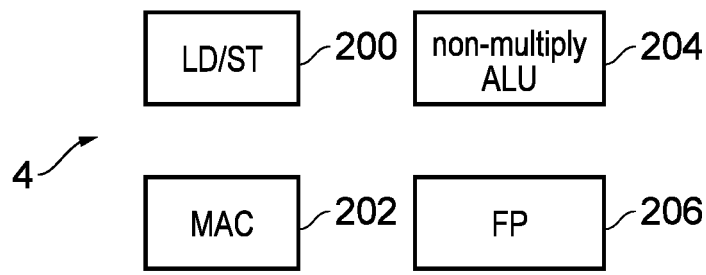
FIG. 13 shows an example of different hardware units within processing circuitry for processing different classes of instructions.

The processing circuitry 4 may include a number of distinct hardware blocks for processing different classes of instructions. For example, as shown in FIG. 13, load/store instructions which interact with a memory system 8 may be processed by a dedicated load/store unit 200, while arithmetic or logical instructions could be processed by an arithmetic logic unit (ALU) 202, 204. The ALU itself may be further partitioned into a multiply-accumulate unit (MAC) 202 for performing in operations involving multiplication, and a further unit 204 for processing other kinds of ALU operations. A floating-point unit 206 can also be provided for handling floating-point instructions. Pure scalar instructions which do not involve any vector processing could also be handled by a separate hardware block compared to vector instructions, or reuse the same hardware blocks.

Figure 2:
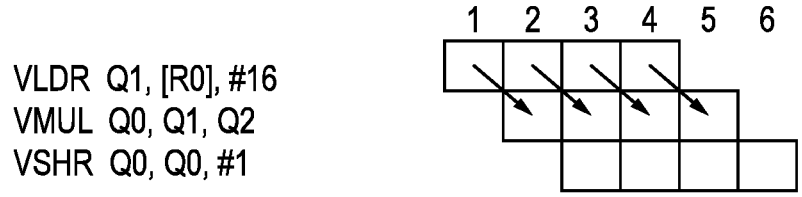
FIG. 2 shows an example of overlapped execution of vector instructions.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 2. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Figure 3:
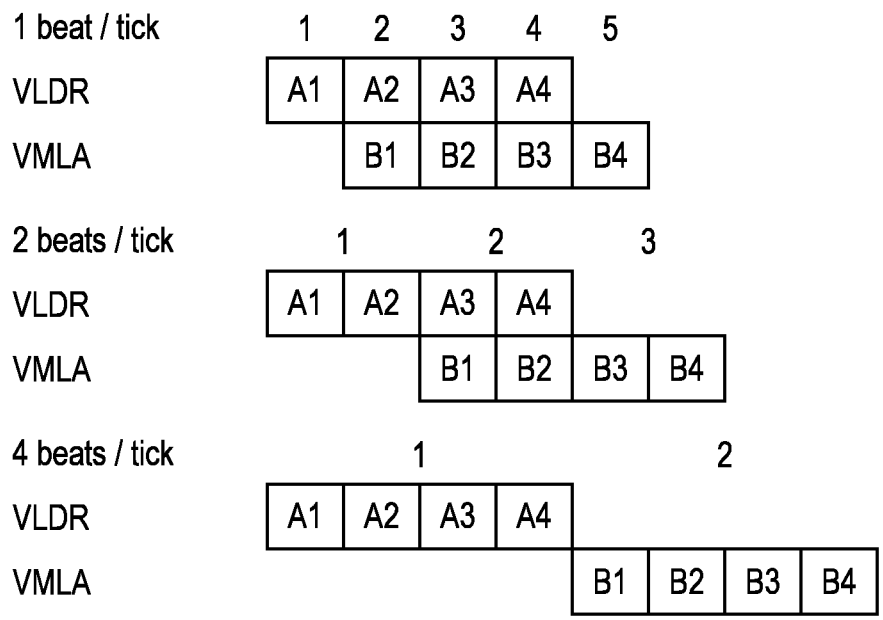
FIG. 3 shows three examples of scaling the amount of overlap between successive vector instructions between different processor implementations or at run time between different instances of execution of the instructions.

Instead, an architecture may support a range of different overlaps as shown in examples of FIG. 3. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 3 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the data element size of the vector being processed. Hence, even if the element size varies from implementation to implementation or at run time between different instructions, a beat is a certain fixed width of the vector processing. If the portion of the vector being processed in one beat includes multiple data elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form a data element.

As shown in FIG. 3 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture are ignored during further description of this disclosure.

As shown in the lower example of FIG. 3, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 3, instruction execution can be overlapped with the first and second beats of a second vector instruction carried out in parallel with the third or fourth beats of a first instruction, where those instructions are executed on different execution units within the processing circuitry (e.g. in FIG. 3 the first instruction is a load instruction executed using the load/store unit 200 and the second instruction is a multiply accumulate instruction executed using the MAC 202).

A yet more energy/area-efficient implementation may provide hardware units which are narrower and can only process a single beat at a time, and in this case one beat may be processed per tick, with the instruction execution overlapped and staggered by one beat as shown in the top example of FIG. 3 (this is the same as the example shown in FIG. 2 above).

It will be appreciated that the overlaps shown in FIG. 3 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 may be provided with beat control circuitry 30 as shown in FIG. 1 for controlling the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

Figure 4:
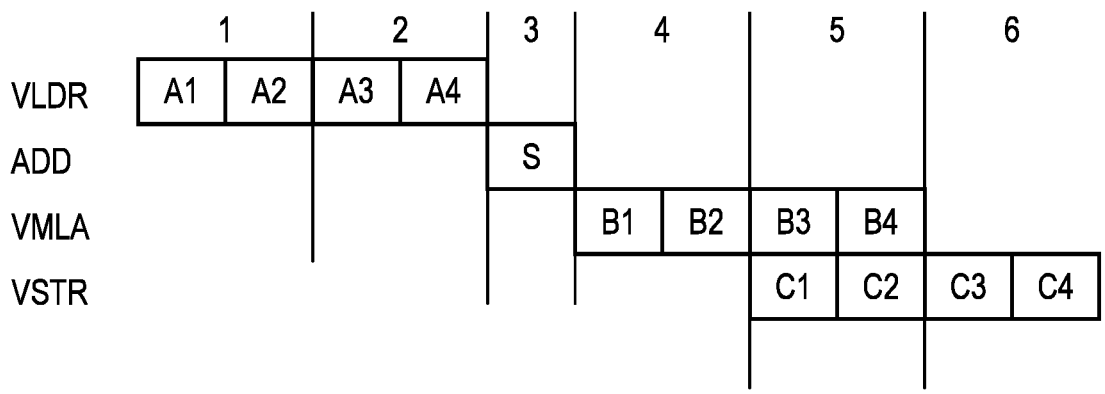
FIG. 4 shows an example where the execution of a scalar instruction breaks the overlap between two vector instructions.

As shown in FIG. 4, the overlap between two vector instructions may also be prevented if there is an intervening scalar instruction. This is because the scalar instruction could depend on the outcome of the last beat of the vector instruction and the second vector instruction could depend on the scalar result in all of its beats, so it may be safer to avoid overlapping vector instructions with scalar instructions.

When overlaps are permitted as discussed above, then there may be multiple instructions executing simultaneously. The program counter 16 may track the address of the oldest uncompleted instruction which has at least one beat still to be completed. The program counter can be incremented when a vector instruction completes its final beat.

While permitting a range of different overlaps of execution vector instructions can allow more efficient use of hardware resources across a range of performance points, it can cause some complexity for handling of exceptions or debug events or other events which trigger a suspension of the current thread of execution. For example, in the example shown in FIG. 2 if an exception was raised on the fourth tick then the register file would contain a partial update from several instructions. One way of handling this would be to treat the partial updates as speculative states that can be reverted if an exception occurs, but this can increase the amount of hardware required since it may be necessary to buffer store requests for storing data out to the memory system 8 until they are committed and to provide additional registers in hardware for tracking the speculative state. Another approach would be to disable exceptions being taken partway through a vector instruction at all, and delay taking the exception until the oldest uncompleted instruction has completed, but increasing exception handling latency can be undesirable, and in the case where an exception is a precise fault such behaviour may break architecture guarantees associated with the fault.

Instead, as shown in FIG. 5, the beat status register 22 can be used to record a beat status value which tracks which beats of a group of adjacent instructions have completed at the point of an exception, debug event or other event leading to suspension of the current thread. By exposing the overlapping nature of the execution to the architecture, this can help reduce the microarchitecture complexity and increase power and area efficiency.

In the example of FIG. 5, the beat status information tracks the completed beats of a group of three vector instructions A, B, C, where instruction A corresponds to the oldest uncompleted vector instruction, instruction B is the next vector instruction after instruction A and the instruction C is the next vector instruction after instruction B. The notation Ax refers to the $x^{th}$ beat of instruction A, where x is between 1 and 4 for a 4-beat vector implementation, e.g. A2 is the second beat of instruction A. While FIG. 5 shows an example where three instructions are tracked using the beat status information, in other examples which permit a greater number of instructions to be partially completed at a given point, the beat status information could track a greater number of instructions. For example, if dual issue is supported then it may be desirable to indicate beat progress for more than 3 instructions. Each value of the beat status field is allocated to a given combination of completed beats. For example, beat status value 0011 indicates that the first and second beats of instruction A and the first beat of instruction B were completed. The particular mapping of particular encoded values of the beat status information to particular sets of beats of the respective group of instructions is arbitrary and could be varied. The beat status value 0000 in this example indicates that there are no incomplete instructions, and therefore no completed beats of incomplete instructions. This may occur for example when the processor has executed a scalar instruction.

FIG. 6 shows some examples of the beat status information recorded at a point when there is a suspension of the current thread of execution. In the top example of FIG. 6 vector instructions are executed with one beat per tick and on the fourth tick a debug event or exception occurs. Hence, at this point the first three beats of instruction A, the first two beats of instruction B and the first beat of instruction C have already completed but beats A4, B3, C2, D1 are still to be performed. Hence the beat status information would have the value 0111 which according to the example of FIG. 5 indicates that the beats A1, A2, A3, B1, B2 and C1 have completed already.

Similarly, in the bottom of the example of FIG. 6, the instructions being executed were such that instructions B and C could not be overlapped (e.g. because they required use of the same hardware unit), and so this time the instructions C and D had not started yet at the time of the debug event or exception. This time an exception occurring on tick four would trigger the recording of beat status information 0110 indicating that beats A1, A2, A3, B1 and B2 had already completed, but not C1.

Similarly, with the two beats per tick example of FIG. 3, if an exception occurs on tick 2 then only beats A1 and A2 would have completed and the beat status value would be 0010. Note that, while values 0001 and 0010 of the beat status information indicate that only one instruction A was partially completed at the time of the exception, the beat status information still indicates which beats of a group of multiple instructions have completed, since it identifies that none of the beats of the next two instructions B, C have completed.

With the four beat per tick example of FIG. 3 the beat status value would be 0000 regardless of when the exception occurs because there would be no partially completed instructions at the time of the exception since each instruction completes within one tick.

When a debug event or exception occurs, the return address is set to the current value of the program counter 16, which represents the address of the oldest uncompleted instruction. Hence in both the examples of FIG. 6 the return address would be set to the address of instruction A. The return address could be stored in a variety of places, including at a location on a stack relative to the value of a stack pointer register, or in a return address register.

Figure 7:
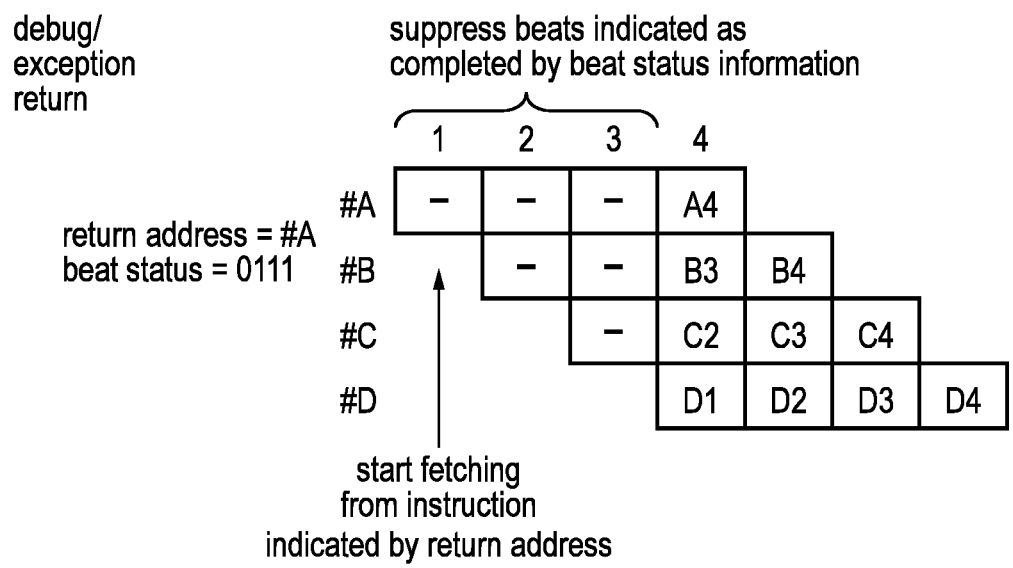
FIG. 7 shows an example of using beat status information to resume processing following return from the debug event or exception.

As shown in FIG. 7, this enables the processor in response to a return-from-event request (e.g. on return from the debug mode or the exception handler) to resume processing from a point determined based on the return address and the beat status information in the beat status register 22. The return-from-event request could be made by the debugger in the case of a debug event, or by the exception handler in the case of an exception event. Following the return-from-event request, fetching of instructions to be processed resumes from the address indicated by the return address, which corresponds to instruction A in this case. Instructions B, C and D follow (this example corresponds to the top example of FIG. 6). However, for the first few cycles after the return any beats indicated by the beat status information as already completed are suppressed. The processor may suppress these beats by preventing the corresponding processing operation being performed at all (e.g. suppressing requests to load or store data or disabling of an ALU or MAC). Alternatively, the operation could still be performed in the case of an ALU operation, but the processor may suppress writing of the result of the operation (i.e. suppress updating of a portion of a destination vector register) so that it does not affect the register state. Another way to suppress a given beat would be to set to a predetermined value (e.g. zero) a portion of the destination vector register corresponding to the given beat. Once the fourth tick is reached, the pipeline has reached the point at which the debug event or exception previously occurred and processing continues as normal. Hence, for the first few cycles after an exception return, the processor may not perform any useful work and is essentially just refetching multiple instructions that were in flight when the original exception or debug event occurred. However, as exception return latency is often not critical for some applications, this may be a good trade off to reduce the latency at the time of taking the exception, and also this helps to reduce the amount of architectural state that needs to be stored on an exception since it is not necessary to speculatively store results of uncompleted instructions. This approach also enables the handling of exceptions which are precise faults raised by a beat of a vector instruction.

Figure 8:
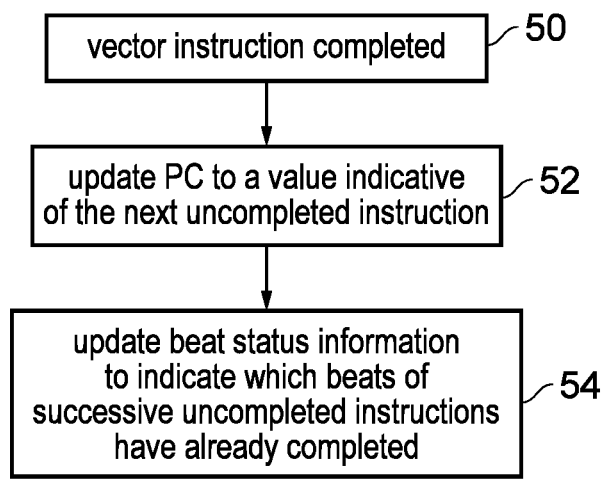
FIG. 8 shows a method of updating status information in response to completion of a vector instruction.

In some cases the beat status information indicating the completed beats of the group of multiple instructions could be set in response to the debug event or exception occurring. However in some implementations it may be easier to update the beat status register each time an instruction completes, regardless of whether an exception has occurred, so that if an exception occurs in the following tick then the beat status register 22 already indicates the already completed beats of the group of instructions. Hence, FIG. 8 is a flow diagram showing a method of updating state when a vector instruction is completed. At step 50 the final beat of a given vector instruction completes. In response, at step 52 the program counter 16 is updated to a value indicative of the next uncompleted instruction. At step 54 the beat status information is updated to indicate which beats of any uncompleted instructions in flight have already completed. For example, the beat control circuitry 30 may set the beat status register 22 based on the timings at which it schedules execution of a series of vector instructions.

While FIG. 5 shows one example encoding of the beat status information, another possibility is to provide the beat status information as a bitmap comprising a number of bits each corresponding to one beat of one of the group of instructions A, B, C etc., with each bit set to one if the corresponding beat has completed and zero if the corresponding has not completed (or vice versa). However, in practice since a later beat of a given instruction cannot have completed if an earlier beat has not yet completed, then it is not required to provide bits for every beat and it may be more efficient to allocate certain encodings of a smaller bit field to particular combinations of completed beats as in the example of FIG. 5.

Figure 9:
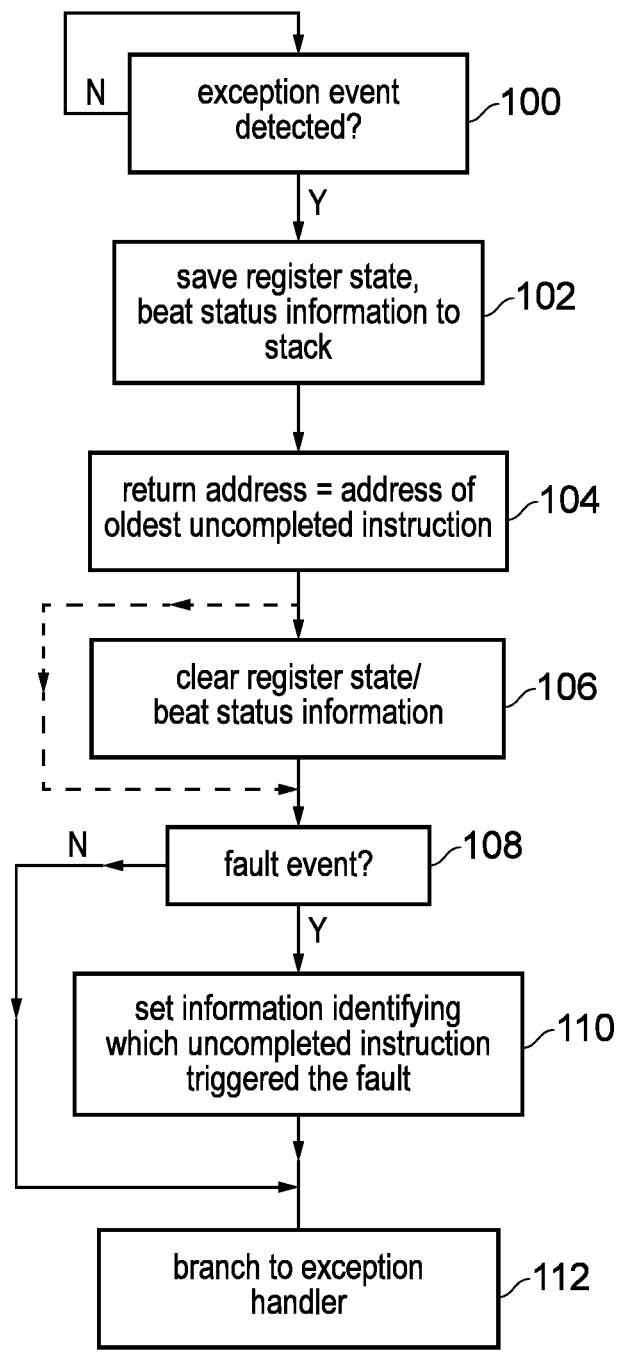
FIG. 9 shows a method of handling an exception event.

FIG. 9 shows a flow diagram showing an example of responding to an exception event. At step 100, the exception event is detected. In response, at step 102 exception control circuitry within the processing circuitry triggers saving of register state (including the scalar registers 12 and the vector registers 14, and the current content of the beat status register 22) to locations in memory at offsets relative to a stack pointer stored in the stack pointer register 20. The group of memory locations storing the register values is collectively referred to as an exception stack frame. The stack pointer represents the top or bottom (depending on implementation choice) of a stack data structure provided in memory for temporarily storing the register state so that the exception handler called in response to the exception can overwrite the data in the registers without losing the previous states of the thread being executed which is being suspended. In some examples, not all the registers 12, 14 may have their state saved to the stack on encountering an exception. It is possible to divide the register files into "caller" state saved automatically by exception handling hardware or by the software thread being executed before the exception arose, and "callee" state for which it is the responsibility of the exception handler to save these registers to the stack if they are going to be overwritten by the exception handler. This approach can provide better alignment with software calling conventions which often require functions to preserve the values of some registers before they are reused. Thus not saving these registers as part of the hardware exception entry processing prevents the redundant double saving of the registers.

At step 104, the return address location in the exception stack frame is set to the address of the oldest uncompleted instruction. This provides a return address to which processing can branch following completion of the exception handler, to resume the previous processing. Optionally, at step 106 the register state in at least some of the scalar registers 12 or vector registers 14, and/or the beat status register 22, can be cleared so that their contents are not visible to the exception handler. This may be desirable for certain secure applications, to protect secure data in the registers or if it is undesirable to give the exception handler visibility of the progress of the previously executing thread. On the other hand, if security is not a concern and it is acceptable to give the exception handler visibility of the previously executing state, step 106 could be omitted.

At step 108 the exception handling hardware detects whether the exception which occurred is a fault event. Exception events may include fault events and non-fault events. A fault event may be triggered by an error caused by a particular instruction executed by the processing circuitry 4. For example, a fault may be triggered if there is an attempt to execute an undefined instruction, or if a load/store instruction triggers a memory fault because the currently executing process does not have permission to access the targeted address or a virtual-to-physical address translation has not yet been defined for the target address. On the other hand, other types of non-fault exception may not be associated with a particular instruction, but may be triggered by an external event (e.g. the user pushing a button on the device, or a signal being received from an external device or peripheral) or some other event not caused by the program being executed (e.g. expiry of a count down timer for triggering an alarm or reminder). If the current exception event is a fault event, then at step 110 the processor may record some information identifying which uncompleted instruction triggered the fault. As there may be multiple instructions in flight due to the overlapping execution discussed above, the return address set in step 104 alone may not be enough to identify which particular instruction triggered the fault and hence how the fault may be handled, so recording an indication of the faulting instruction can help certain fault conditions be handled correctly (e.g. if there are multiple load/store instructions in flight then a memory fault may be attributed to a particular instruction to enable the fault to be addressed for example by paging in translation data for the required address). On the other hand, if the exception is not a fault event then step 110 is omitted since the exception can be handled without knowing which particular instruction triggered the exception. Regardless of the type of exception event, at step 112 the processor triggers a branch to an exception handler corresponding to the type of exception event that was detected. For example, the processor may reference an exception vector table which is indexed based on an identifier of the type of exception detected, and the table may provide the address of the corresponding exception handler.

Figure 10:
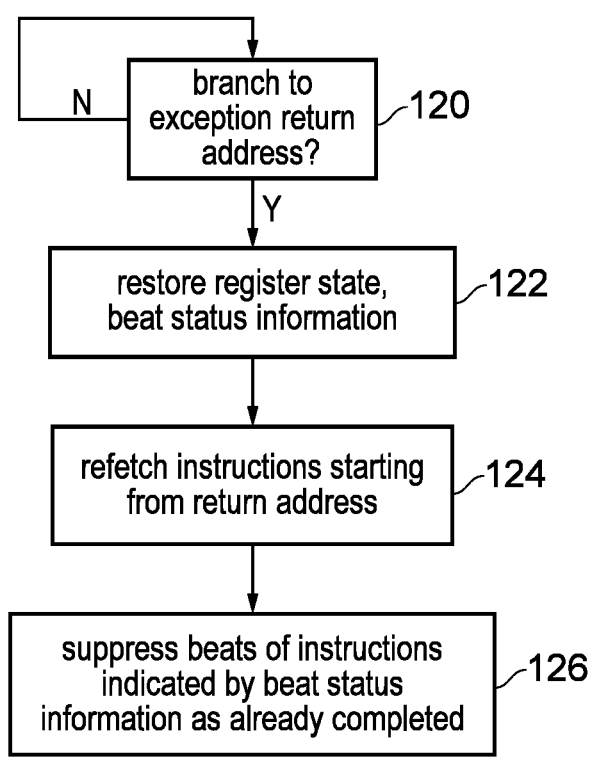
FIG. 10 shows a method of returning from handling of an exception event.

FIG. 10 shows a flow diagram illustrating operations performed when returning from handling of an exception. The exception handler may typically end with an exception return instruction, which indicates that processing should return to the previous thread interrupted by the exception, alternatively a return from an exception handler may be performed by branching to a special reserved address that processor detects as an exception return request. Hence, the return instruction may trigger the return-from-event request. When such an exception return is detected at step 120, At step 122, the register state previously saved to the stack, and the beat status information are restored from the stack location indicated in the stack pointer register 20 and written to the register file 10. At step 124 the processing circuitry 4 resumes fetching of the instructions starting with the instruction whose address is specified by the return address location in the exception stack frame. As described above, this is the address of the oldest uncompleted instruction at the time that the exception occurred. At step 126 the processor uses the beat status information to suppress effects of beats of instructions indicated by the beat status information as already completed. While some instructions may simply generate the same result again if an already completed beat is repeated, other types of instruction may generate a different result if a given beat is performed twice. For example, an atomic memory update instruction for atomically incrementing the value at a given memory location could lead to the wrong result if it was carried out once before the exception was handled and again after resuming processing following the exception (leading to two increments rather than one). Therefore, by suppressing already completed beats of instructions based on the beat status information, correct processing can be ensured. Meanwhile, regardless of the particular way in which the actual hardware implementation handles the processing of consecutive vector instructions, by providing flexibility for the beat status information to indicate different patterns of completed beats for a group of multiple instructions, this enables the architecture to scale to different performance points more efficiently.

While FIGS. 9 and 10 show an example of using the beat status information to handle taking and resuming from an exception, the beat status information can also be used for any other event which triggers suspension of a thread of execution. For example on a debug event which triggers the switch to a debug mode in which debug instructions injected from an external debugger are executed, the beat status information could be used to enable processing to resume from the correct beats of multiple instructions following exit from the debug mode. Similarly, the beat status information could be used in a similar way for any other kind of event which triggers suspension of the thread of execution.

While in the examples given above the return address stored to the exception stack frame on encountering an exception is set as the address of the oldest vector instruction for at least one beat is still to be completed, this is not essential. The return address could be any address which enables the point at which processing is to be resumed to be identified. In some cases the point at which processing is to be resumed may be derived both from the return address and the beat status information. For example, it may be possible for the return address to indicate the youngest vector instruction for which at least one beat has started, which together with a beat status information indicating which preceding instructions have only partially completed may be enough to enable those instructions to be refetched following handling of the exception or other event. However, this approach can be more complex when there are branches within the group of partially completed instructions. Using the address of the oldest uncompleted instruction as the return address simplifies handling of groups of instructions including a branch since it is not necessary to step back through the code to try to identify the addresses of previously executed instructions across the branch.

In general, the beat status information discussed above indicates which beats have completed for a plurality of vector instructions. The plurality of vector instructions may comprise at least the oldest vector instruction for at least one beat is still to be completed and at least one subsequent vector instruction. The subsequent vector instructions need not be consecutive with the oldest vector instruction, since for example there may be an intervening scalar instruction. In some cases, some execution slots in which a vector instruction could have been executed may be empty because there were not enough instructions to be executed, and so in this case the beat status information will indicate corresponding beats as not having completed.

This approach enables scaling across a range of hardware implementations. In some cases the processing circuitry may comprise hardware which is insufficient for performing all the beats of a given vector instruction in parallel. Hence, the processing circuitry may perform a second subset of the beats of a given vector instruction after completing a first subset. The first and second subsets may comprise a single beat or could comprise multiple beats depending on the processor implementation.

To increase utilisation of hardware units it is possible to perform the second subset of beats for a first vector instruction in parallel with performing the first subset of beats for a second vector instruction. This is particularly useful when the first and second vector instructions are to be executed using different hardware units. Control circuitry may be provided to vary from instruction to instruction how many beats of one vector instruction are to be completed before commencing a first beat of a following vector instruction. Varying the scheduling at run time enables the processor to respond to the available resources at a given instance of execution instruction to choose the most appropriate scheduling.

Alternatively, other implementations may comprise hardware which supports performing all the beats of the given vector instruction in parallel. While exception handling and debugging is simpler for such hardware an instruction will be fully completed at the point an exception is taken or debug mode is entered, nevertheless processing circuitry with such hardware can still generate and use the beat status information as specified above, but the beat status information will normally indicate that there were no completed beats for the oldest incomplete instruction at the point the processing was suspended (the 'inactive' case in FIG. 5). Hence, by defining the beat status information, the architecture can support a range of different implementations.

In some systems, the beat status information may be internal state used by the processor to determine how to resume processing but may not be made accessible to the user or to software executing on the processor.

However, in other examples the beat status information may be fully visible and exposed to at least one of software being executed by the processing circuitry, an exception handler and a debugger.

Optionally the processing circuitry may be arranged to save the beat status information to a location in a data store indicated by a stack pointer register, and if necessary clear the beat status information on responding to an exception event, to hide the beat status information from the exception handler. In particular, in a system supporting multiple security states including at least a secure state and a less secure state, if the exception event causes a transition from the secure state to the less secure state, then the processing circuitry may clear the beat status information in response to the exception event.

A further option would be for the processing circuitry to disable access to the beat status information in response to a first exception event, and to re-enable access in response to an exception event. If the exception handler attempts to access the beat status information, or a further vector instruction comprising multiple beats of processing is executed, the beat status information may be lazily saved to a predetermined location. The lazy saving of this information could either be performed automatically by the processing circuitry, or by a nested, second exception handler triggered by the first exception handler's attempt to access the beat status information, or execute a vector instruction. Although more complex, this lazy saving approach can reduce the amount of information to be saved when an exception is taken, and thus reduce the time taken to entry time-critical exception handlers.

Supporting overlapped execution of vector instructions as discussed above can help to enable the architecture to be executed on a range of hardware implementations at different performance points. However, it can cause some issues when executing mixed-scalar-vector instructions which involve both the scalar register file 12 and the vector register file 14. While vector instructions in general specify one or more source registers and a destination register, at least one of which is a vector register 14, a subset of those vector instructions are mixed-scalar-vector instructions for which another of the one or more source registers and the destination register is a scalar register 12. The overlapped execution of the type shown in FIGS. 2 and 3 generally works for pure vector instructions because dependencies tend to stay within the same lane of vector processing, without cross-lane dependencies. This means it is possible to execute different beats of different instructions in parallel without introducing hazards caused by dependencies. It is possible that there could be some types of vector instruction which require cross lane operations, such as permutation instructions, and for such instructions the overlapped execution may not be used, but in general most vector instructions can stay in lane and can use the overlapping technique.

However, with mixed-scalar-vector instructions there is often a dependency between the scalar value and each of the lanes of vector processing. For example, when the scalar register is a source register of the mixed-scalar-vector instruction, each of the lanes of vector processing may be dependent on the same scalar value in the scalar register. An example of this type of mixed-scalar-vector instruction may be a load/store instruction which uses a scalar register to store a pointer for determining the target address to be used for the load/store operations in each of the vector lanes. On the other hand, when the scalar register is the destination register of a mixed-scalar-vector instruction, the processing circuitry may generate a scalar result to be stored to the scalar register which depends on the outcome of each of the lanes of vector processing. An example of this type of instruction may be a multiply accumulate instruction which performs multiplications of pairs of elements in each lane and accumulates the results of each lane's multiplication into a scalar accumulator register. In some cases, the same scalar register may be used as both a source register and a destination register by a mixed-scalar-vector instruction. For example a load/store instruction may use a scalar register as a pointer to the required address but may also update the pointer based on a given increment to ensure that a subsequent load/store instruction uses a different address. Another example of where a scalar register may be both a source and destination is where the multiply accumulate instruction adds on to the previous value in the scalar register rather than overwriting the previous value. The pointer update could be carried out either before or after the address for the current load instruction is calculated.

Figure 11:
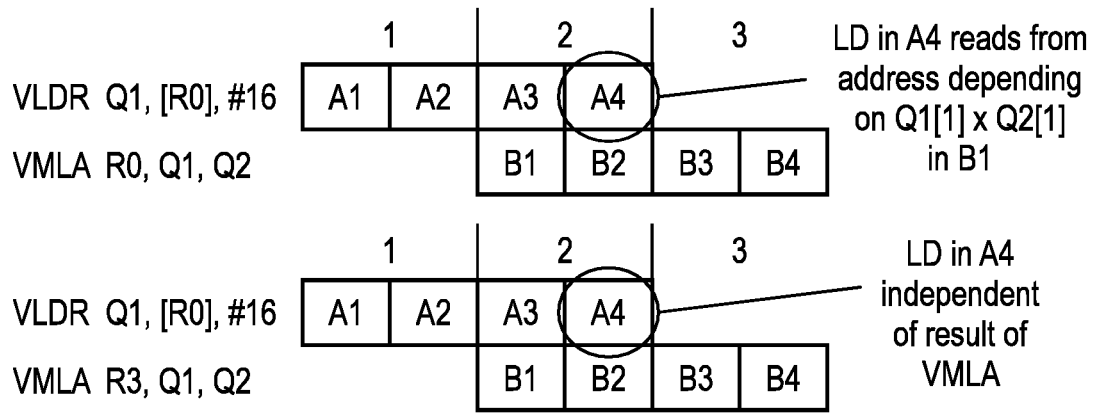
FIGS. 11 and 12 show examples of relaxed execution when overlapping beats of mixed-scalar-vector instructions.
Figure 12:
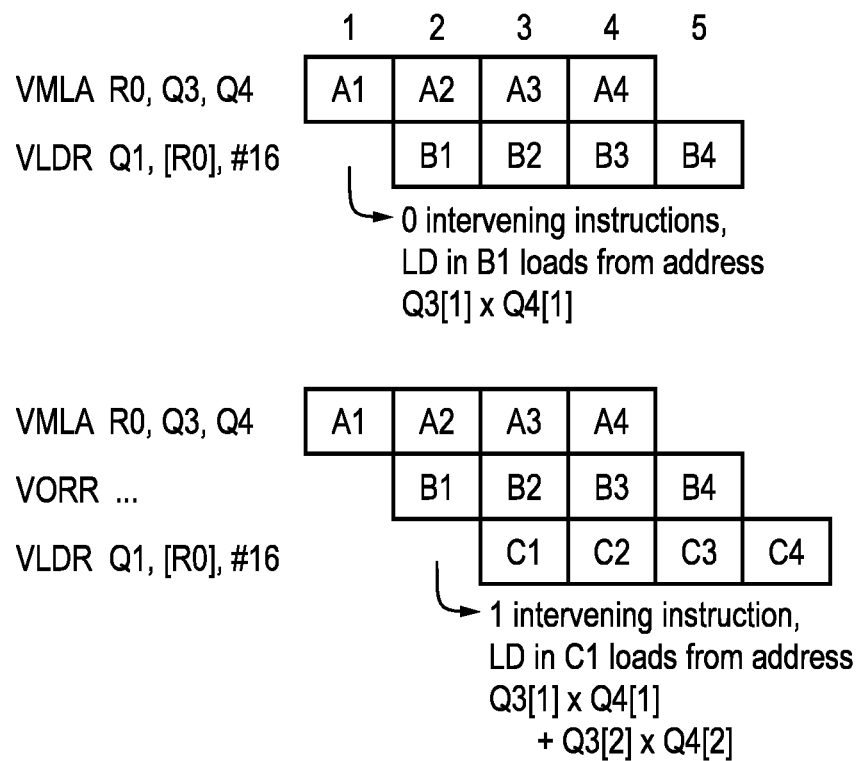

FIGS. 11 and 12 show two examples of instances of relaxed execution which can arise when two mixed-scalar-vector instructions are executed with an overlap. In the example of FIG. 11, a vector load (VLDR) instruction is followed by a vector multiply accumulate (VMLA) instruction. Hence, in this example the first mixed-scalar-vector instruction (VLDR) has a source register which is a scalar register R0 and the second instruction has a destination register R0 or R3 which is also a scalar register. For correct processing results, the result of the second instruction should not affect the source operand of the first instruction—a younger instruction should not affect the inputs of an older instruction. Therefore, one would think that which particular scalar register is used as the destination register of the second instruction should not affect the outcome of the first instruction.

However, as shown in FIG. 11, when execution of the two instructions is overlapped (in this example with two beats per tick), then the VMLA instruction starts to update the scalar register in beat B1 before the final beat A4 of the VLDR instruction has been completed. If the destination scalar register R3 of the VMLA instruction is different to the source register R0 of the VLDR instruction as in the bottom example of FIG. 11, then the VMLA instruction does not affect the outcome of the load, and the load operation performed in beat A4 is independent of the results of the multiply accumulate. This is the correct outcome. However, if the VMLA instruction specifies the same scalar register R0 as the VLDR instruction, as shown in the top example of FIG. 11 the address of the load would depend on the multiply-accumulate operation performed in beat B1 of the VMLA instruction, so that the second instruction effects the outcome of the first. Hence, beat A4 of the VLDR instruction can provide entirely different results (loading from different addresses) depending on whether the subsequent VMLA instruction specifies the same scalar register or not. Furthermore since the amount by which the VLDR and the VMLA overlap may depend on a number of factors, such as the implementation of the processing circuitry and the resources available at runtime, whether the result of the VLDR is corrupted by the subsequent VMLA may not be determinable when the code is written or compiled. Such uncertainty would be regarded as undesirable and incorrect.

On the other hand, in the example of FIG. 12 the VMLA instruction occurs before the VLDR instruction. Hence this time the first mixed-scalar-vector instruction has a destination register which is a scalar register and the second mixed-scalar-vector instruction has a source register which is a scalar register. This time, while one would expect that the second instruction should depend on the first, the overlapped execution can cause the outcome of the second instruction to depend on how many intervening instructions are executed between the first and second mixed-scalar-vector instructions. For example in the top example of FIG. 12 the number of intervening instructions is zero, and so the first beat B1 of VLDR is performed in parallel with the second beat A2 of VMLA (this example uses one beat per tick). Hence, only the first beat A1 of VMLA has completed before beat B1 of VLDR, and so the target address of VLDR would depend the product of elements Q3[1], Q4[1] multiplied in beat A1 of the VMLA instruction. On the other hand, in the bottom example there is one intervening VORR instruction, so that VLDR is now instruction C. This time the first beat C1 of VLDR is performed in parallel with beat A3 of VMLA and so the target address calculated in beat C1 of the load depends on the accumulation of the first two beats of VMLA (i.e. Q3[1]*Q4[1]+Q3[2]*Q4[2]), so it will load from a different address compared to the top example of FIG. 12.

One would regard both the examples of FIG. 12 as incorrect since the correct processing result of the load would be to have the value in R0 correspond to the outcome of all the accumulations performed in beats A1 to A4 of the multiply accumulate. Nevertheless, having the outcome of a given instruction depend on how many intervening instructions separate it from the instruction on which it depends would also be regarded as undesirable and lead to incorrect processing results.

There are various approaches for addressing this issue. One approach would be to never overlap execution of mixed-scalar-vector instructions. However, since for some practical applications (e.g. DSP), the mixed-scalar-vector instructions may represent a significant fraction of the total number of vector instructions executed, so preventing overlapped execution of mixed-scalar-vector instructions can negate much of the advantage of overlapping the execution of vector instructions in the first place. This can lead to hardware blocks such as a multiply accumulate unit or load/store units being left idle for much of the time which reduces the efficiency of the processor. In many cases successive mixed-scalar-vector instructions would not refer to the same scalar register and in this case it could be acceptable to overlap execution. Hence, it would desirable to enable this overlapped execution when possible.

Another approach may be to reduce the number of mixed-scalar-vector instructions provided in the instruction set architecture, so that most vector instructions, even if they generate a scalar result or use a scalar operand, read/write their scalar value from/to the vector file, and a limited number of types of mixed-scalar-vector instructions are provided solely for transferring data between the scalar and vector register files 12, 14. However, confining vector instructions to use only the vector register file increases pressure on the storage capacity and read/write ports of the vector register file 14, which can affect the performance, area and power of a processor. Hence, it can be desirable to continue to support a reasonable number of mixed-scalar-vector instructions.

Another approach may be to provide register dependency checking circuitry in hardware for comparing the registers specified as the scalar register by the respective mixed-scalar-vector instructions and preventing overlapped execution when there is a dependency on the same scalar register between a pair of mixed-scalar-vector instructions. However, particularly for relatively low power implementations, providing such dependency checking circuitry can have a noticeable impact on the overall power consumption and circuit area of the apparatus because comparators can be relatively expensive in terms of gate count.

In practice, in normal program code using vector instructions, the chance of having of having a scalar dependency such as the ones shown in FIGS. 11 and 12 is extremely low. FIGS. 11 and 12 are not particularly realistic examples because it is very unlikely that one would want to write the sum of multiplications into a register being used as the pointer for a load, or to load data from an address previously generated by a multiply accumulate instruction. This mixing of pointer value and accumulate simply does not make sense from a code point of view, and is explained as an example of the uncertainty which can arise from overlapped execution of instructions.

In practice, the inventor recognised that a more efficient microarchitecture can be built if it is permitted for certain combinations of mixed-scalar-vector instructions to lead to unknown results, which could potentially be incorrect. The two instances of relaxed execution shown in FIGS. 11 and 12 are therefore permitted when the first and second mixed-scalar-vector instructions occur with fewer than a predetermined number of intervening instructions between them. The inventor recognised that in practice it is rare that code includes such combinations of instructions, and so providing the expensive dependency checking circuitry to guard against such rare cases is a waste of power and area. In practice, some more efficient techniques can be used to ensure that, for the few situations in which dependencies are likely to occur, the correct results can be achieved. By providing an instruction set architecture which permits results to be "unknown" in other dependent situations, the overall micro-architecture hardware implementation can be made more efficient. It is then up to the programmer to avoid writing code with the corner cases in which unknown results can occur—as described below the architecture can define some relatively simple rules to guide the programmer to avoid such situations, so that the processing hardware itself does not need to check for these.

Hence, when executing a sequence of instructions including a first mixed-scalar-vector instruction specifying a first scalar register and a subsequent mixed-scalar-vector instruction specifying a second scalar register, with fewer than a predetermined number of intervening instructions between the first and subsequent mixed-scalar-vector instructions, the processor may support relaxed execution in one of the following ways:

where the first scalar register is a source register and the second scalar register is a destination register the processing circuitry is configured to permit overlapped execution of said first and subsequent mixed-scalar-vector instructions to generate a result of said first mixed-scalar-vector instruction which differs depending on whether the second scalar register is the same register as said first scalar register (as in the example of FIG. 11);

where the first scalar register is a destination register and said second scalar register is a source register and said first scalar register and said second scalar register are the same register (with the predetermined number of intervening instructions or fewer between the first and subsequent mixed-scalar-vector instructions), the processing circuitry is configured to permit said overlapped execution of said first and subsequent mixed-scalar-vector instructions to generate a result of said second mixed-scalar-vector instruction which differs depending on a number of intervening instructions between the first and subsequent mixed-scalar-vector instructions (as in the example of FIG. 12).

This approach is extremely counterintuitive since one would expect it would lead to incorrect processing results and uncertainty in the outcome of executing a given set of instructions, since the results may depend on the particular way in which a particular micro-architectural implementation chooses to overlap the execution of the instructions. However, by permitting this uncertainty, this gives more freedom to vary the microarchitecture and avoids the expense of dependency checking. In any case, practical real-world applications of these types of mixed-scalar-vector instruction make it very unlikely that the programmer will wish to use the cases where the relaxed execution occurs.

Note that in the first of the two examples of relaxed execution listed above, where the first scalar register is a source register and the second scalar register is a destination register, the first scalar register could also be a destination register. Likewise, the second scalar register may be a source register as well as a destination register. Alternatively, in other examples the first scalar register could be purely a source register, but not a destination register, or the second scalar register could be purely a destination register, but not a source register. Similarly, in the second example of relaxed execution where the first scalar register is a destination register and the second scalar register is a source register, the first scalar register could also be a source register, and the second scalar register could also be a destination register. Hence, specifying that a particular scalar register is a source register, or a destination register, does not exclude that the scalar register could also be the other type of register.

This approach is particularly useful when at least one of the first and subsequent mixed-scalar-vector instructions is an arithmetic instruction.

Figure 14:
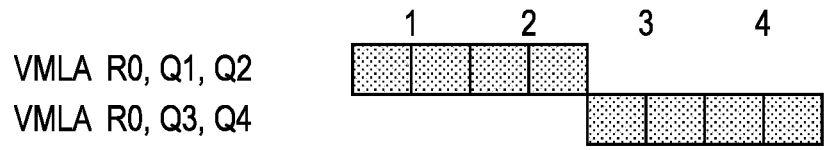
FIG. 14 shows an example of preventing overlapped execution when two mixed-scalar-vector instructions of the same class are encountered.

In practice, the most common real dependencies in real code between mixed-scalar-vector instructions occur when multiple instructions from related groups have a register dependency. For example, several memory instructions may use the same pointer value, or several multiply accumulate instructions may accumulate into the same accumulator register as shown in the example of FIG. 14. As shown in FIG. 13, the processing circuitry 4 may include a number of distinct hardware units 200, 202, 204, 206 corresponding to different classes of instructions. For example the hardware units may include a load store unit 200 for executing the memory instructions, a multiply accumulate unit 202 for executing any instruction involving a multiplication, an ALU for executing other arithmetic or logical instructions other than multiplies, and a floating-point unit 206 for executing floating point instructions. Hence, instructions can be classed in terms of which hardware unit is designed to execute them.

In this case, when there are multiple instructions in the same class to be executed, the second one may not be able to start until the first instruction is completed because there are competing for the same execution resources. Hence, in this case the natural pipeline structural hazards can resolve the register dependency without the need for extra dependency checking circuitry to compare the register specifiers of each instruction. Hence, the architecture may define different classes of instructions and require that the relaxed execution of the type shown in FIG. 11 or 12 should be prevented when the first and second mixed-scalar-vector instructions are both from the same class. The hardware for checking the class of the instruction can often require less additional overhead than the hardware for comparing register specifiers of different instructions (since decoding of the opcodes may already be required in the instruction decoder 6 for controlling which of the hardware units 200, 202, 204, 206 processes the instruction), so this approach can be more area- and power-efficient.

The particular definition of the classes may vary from embodiment to embodiment. While FIG. 13 shows an example with four execution units which could be mapped to four classes corresponding to memory access instructions, multiply instructions, non-multiply arithmetic instructions and floating point instructions, the classes could be expanded to encompass other instructions, or one or more of these classes could be omitted or combined with another class. Also, some vector instructions may not be allocated to any particular class so that their execution can be overlapped with other vector instructions regardless of their type.

For example, in the most common cases of scalar dependencies between vector instructions likely to arise in real code, two multiply instructions or two load instructions may use the same scalar register and so may be enough simply to define a first class including at least a load instruction and a second class including at least a multiply instruction (including multiply accumulates). Any other vector instruction may be treated as one which can be overlapped regardless of their type. Preventing several multiply instructions or several loads overlapping may be enough to resolve the most common real dependencies.

Figure 18:
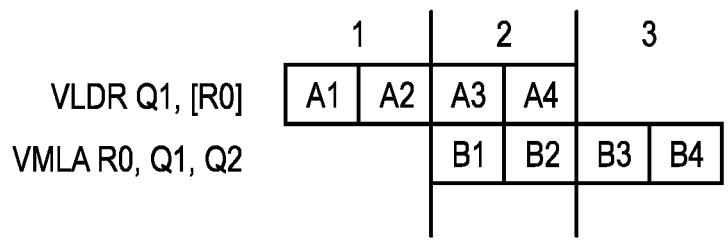
FIG. 18 shows a further example of overlapped execution of mixed-scalar-vector instructions.

More generally, the processing circuitry may support different classes of mixed-scalar-vector instruction, and the processing circuitry may prevent the relaxed execution of a first and subsequent mixed-scalar-vector introduction when they are both from the same class. While one way of preventing the relaxed execution may be to prevent the instructions being overlapped, another approach may be to remap which register is specified by one or other of the instructions so that they no longer depend on each other. For example, in the case shown in FIG. 18 where the first mixed-scalar-vector instruction uses the scalar register as a source register (but the scalar register is not used as a destination register by the first mixed-scalar-vector instruction) and the second instruction uses a scalar destination register, relaxed execution can be prevented by copying a scalar value from the first scalar register referred to by the first instruction to a different third scalar register not referenced by the second instruction so that the instructions now point to different registers. On the other hand, this register remapping may also require some overhead in terms of circuit area and so in many cases it may be more efficient simply to prevent the relaxed execution by avoiding overlapped execution for these instructions.

While the classes may in general correspond to classes of instructions which use the same hardware circuit unit, there may be some classes which correspond to two or more different hardware units. For example a group of instructions may be classed as "other" if they are not common enough to warrant a class by themselves then these may be executed using any other number of different hardware circuit units. The particular way in which a given implementation chooses to execute different kinds of instructions on different hardware units is an implementation choice at the micro-architecture level, and so the architecture may simply define classes in terms of the likely implementations without reference to the particular hardware units which are actually used.

Figure 15:
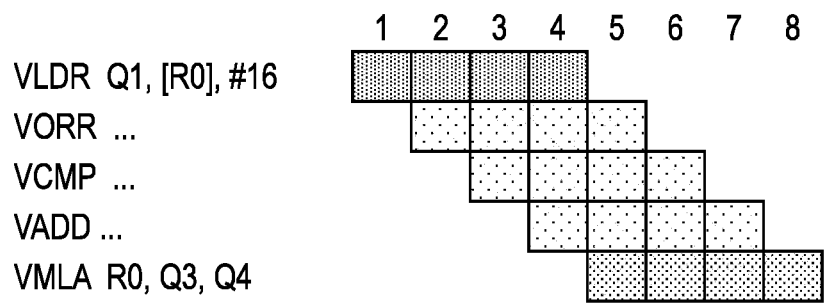
FIG. 15 is an example showing how separating two mixed-scalar-vector instructions by a predetermined number of intervening instructions helps to avoid the relaxed execution.
Figure 16:
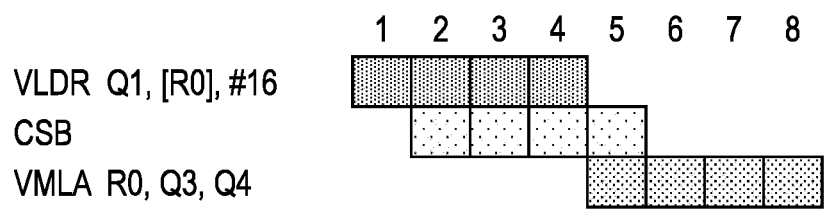
FIG. 16 shows an example of using a barrier instruction to prevent relaxed execution.

FIGS. 15 and 16 show other techniques which could be used at the program code level to ensure that dependencies between two mixed scalar vector instructions are satisfied. As shown in FIG. 15, once two mixed-scalar-vector instructions are separated by a sufficient number of intervening instructions, then there would be no overlap between those mixed-scalar-vector instructions and so the dependencies will already be satisfied. The predetermined number of intervening instructions at which separation is assured will depend on the particular micro-architectural implementation. For example, in an implementation which processes one beat per tick and staggers execution of consecutive vector instructions by one beat, the predetermined number of intervening instructions is N−1 (where N is the number of beats per vector instruction), e.g. 3 intervening instructions for a 4-beat vector in the case of the above examples. More generally, for systems with single issue of instructions in which a vector instruction is processed using $2^J$ beats of processing, where J is an integer greater than or equal to 1, and in the overlapped execution, the processing circuitry performs a first beat of a second vector instruction in parallel with a $(2K+1)^{th}$ beat of a first vector instruction, where K is an integer and $0 \le K < J$, then the predetermined number of intervening instructions may be $(2^{(J-K)}-1)$. For systems which support dual issue, the predetermined number of intervening instructions may be greater.

Hence, in general the predetermined number of instructions is the minimum number of intervening instructions between two successive mixed-scalar-vector instructions which ensures that it is not possible to overlap any beat of the first mixed-scalar-vector instruction with a beat of the second mixed-scalar-vector instruction. To provide the programmer or compiler with some certainty that two instructions will have their dependency honoured, the instruction set architecture may specify a certain minimum value for the predetermined number of intervening instructions, and a micro-architecture compliant with that architecture should provide circuitry for ensuring that the outcome is correct and repeatable when instructions are separated by at least that number of instructions. Nevertheless, this gives the freedom for the micro-architecture to permit uncertain results if the programmer separates two mixed-scalar-vector instructions of different classes by fewer than the predetermined number of instructions.

Hence, the programmer or compiler can ensure that two dependent mixed-scalar-vector instructions will have their dependency satisfied by including at least the minimum number of intervening instructions between them as specified by the architecture. As in many cases dependent mixed-scalar-vector instructions will already be separated by enough instructions then it is often not justified to provide register dependency checking circuitry to guard against the occasional case when they are closer together.

On the other hand, if it is desired to provide dependent mixed-scalar-vector instructions with fewer than the predetermined number of intervening instructions between them, in cases where they are not in the same class as discussed with respect to FIGS. 13 and 14, then the architecture may also provide an overlap barrier instruction CSB which can be included in the program code to force the hardware to honour the dependency between the two mixed-scalar-vector instructions either side of the barrier. Hence, when there is an overlap barrier instruction intervening the processing circuitry may prevent the relaxed execution of mixed-scalar-vector instructions on either side of the barrier, either by preventing overlap or by remapping the register specifiers.

Different implementations may handle the barrier instruction in different ways. For the single beat per tick microarchitecture as in the top example of FIG. 2, some circuitry may be provided to detect the barrier instruction and insert enough bubbles in the pipeline to allow the second instruction to be started after the first completes. For a dual beat microarchitecture as shown in the second example of FIG. 2, a single bubble may be enough since half the instruction is processed both tick, and so the barrier instruction can be implemented by executing a no-op operation. For a quad beat microarchitecture that has enough execution resource to execute the whole vector operation in one tick, the dependencies would already be satisfied without any stalling or padding, and so higher performance microarchitectures would not actually need to do anything for a barrier instruction, and could simply eliminate the barrier instruction at an earlier stage of the pipeline (e.g. at the fetch or decode stage) to improve performance. Hence, while code written for the architecture can include the barrier instruction in case it is being execute on implementation which overlaps vector instructions, other microarchitectures may not need to actually inject a no-op and can ignore the barrier.

Hence, on the very rare occasion when a programmer really wishes to provide different classes of mixed-scalar-vector instructions which are dependent on a common scalar register and are separated by fewer than the predetermined number of instructions intervening, the barrier can be used. Essentially, the architecture may specify that if the programmer or compiler wishes to separate instructions by fewer than a given number of instructions, they should use the barrier otherwise they risk uncertain results.

Figure 17:
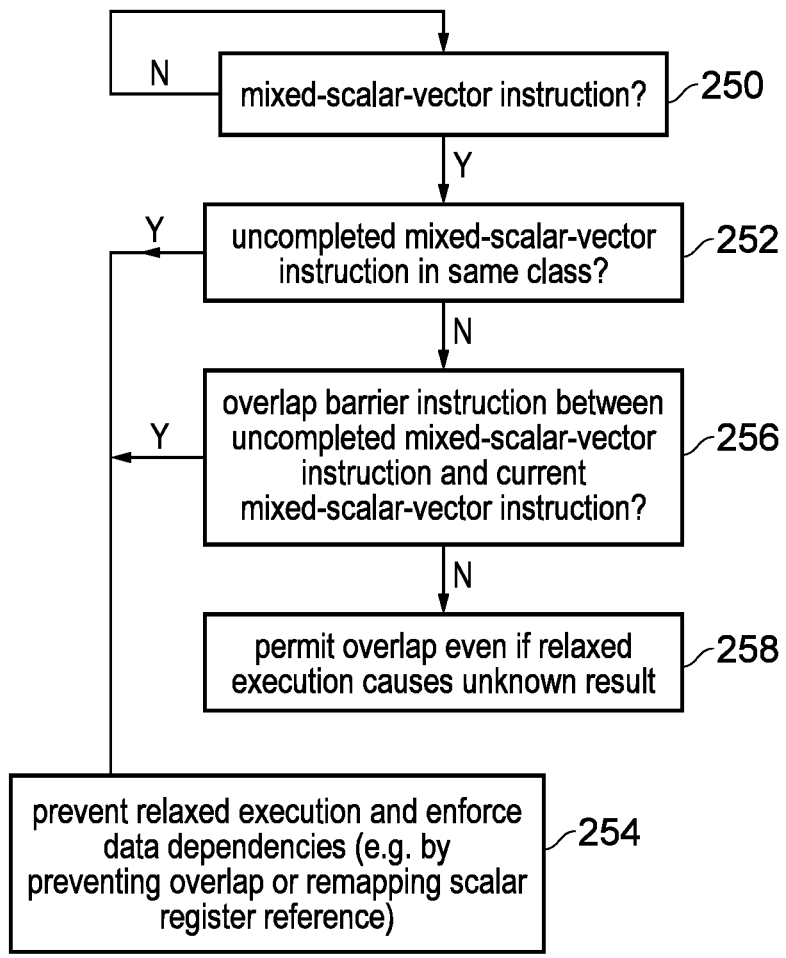
FIG. 17 shows a method of handling mixed-scalar-vector instructions.

FIG. 17 shows a flow diagram illustrating a method of handling mixed-scalar-vector instructions. At step 250, the instruction decoder detects whether an instruction to be processed is a mixed-scalar-vector instruction. If not, the instruction is handled according to the processing appropriate for that type of instruction. If the instruction is a mixed-scalar-vector instruction, at step 252, the beat control circuitry 30 detects whether there is a previous mixed-scalar-vector instruction which is not yet complete, and is from the same class as the current mixed-scalar-vector instruction. Note that the previous mixed-scalar-vector instruction may not yet have started execution, as the detection of the instructions and scheduling of the beats may take place at an earlier stage of the pipeline. Alternatively, the previous mixed-scalar-vector instruction could be partially executed.

If there is an uncompleted mixed-scalar-vector instruction from the same class, at step 254 the beat control circuitry 30 takes an action to prevent relaxed execution of the form shown in the examples of FIGS. 11 and 12. This action could be delaying scheduling of the current mixed-scalar-vector instruction for execution until the previous mixed-scalar-vector instruction has completed, to prevent the instructions being overlapped. Alternatively, in the case where the current mixed-scalar-vector instruction specifies a second scalar register as a destination register, the previous mixed-scalar-vector instruction specifies a first scalar register as a source register, and the previous mixed-scalar-vector instruction has not yet started execution, the action may comprise writing a value from the first scalar register to a third scalar register different from the second scalar register, and executing the previous mixed-scalar-vector instruction using the third scalar register instead of the first scalar register. Note that if the current mixed-scalar-vector instruction is from the same class as the previous mixed-scalar-vector instruction, the response action at step 254 is taken regardless of whether the scalar registers specified by the previous and current mixed-scalar-vector instructions are actually the same register, just in case they are the same, since there is no dependency checking circuitry provided in hardware to compare the register references.

At step 256 the beat control circuitry also checks whether an overlap barrier instruction has been encountered between the previous mixed-scalar-vector instruction and the current mixed-scalar-vector instruction. If so, again at step 254 a response action is taken to avoid the relaxed execution, either by remapping register references or by preventing overlapped execution. While FIG. 17 shows steps 252 and 256 being performed sequentially with the class-checking step 252 performed before the step of checking for an overlap barrier instruction, they could also be performed in the opposite order or in parallel with each other.

If the previous and current mixed-scalar-vector instructions are not from the same class (or are from the 'other' type of instruction for which no restrictions are imposed on overlapped execution) and there is no overlap barrier instruction between them, then at step 258 overlapped execution is permitted even if relaxed execution causes unknown results of the types shown in FIGS. 11 and 12.

In summary, by relaxing the dependency checking around scalar register updates from vector instructions and instead relying on some more lightweight architectural mechanisms as discussed above, real life dependencies can be satisfied without the need for extra checking hardware for comparing register specifiers which enables a more efficient implementation.

Figure 19:
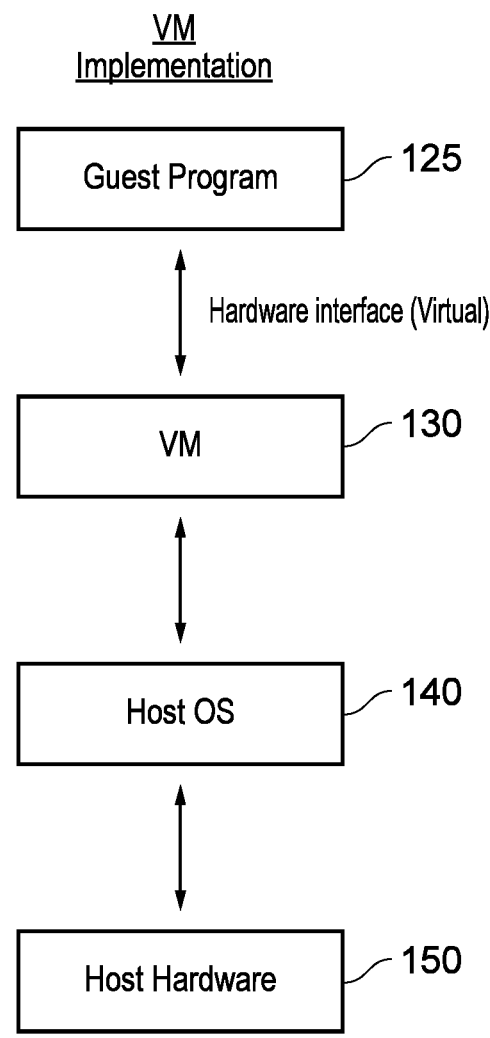
FIG. 19 shows a virtual machine implementation which can be used.

FIG. 19 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 150 running a host operating system 140 supporting a virtual machine program 130. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 130 provides a virtual hardware interface to a guest program 125 which is the same as the hardware interface which would be provided by the real hardware which is the device being modelled by the virtual machine program 130. Thus, the program instructions, including the control of memory accesses described above, may be executed from within the guest program 125 using the virtual machine program 130 to model their interaction with the virtual machine hardware. The guest program 125 may be a bare metal program, or alternatively it may be a guest operating system that runs applications in a similar way to how Host OS 140 runs the virtual machine application 130. It will also be appreciated that there are different types virtual machine, and in some types the virtual machine runs directly on the host hardware 150 without the need for a host OS 140.

Example arrangements are set out below in the following clauses:

(1) An apparatus comprising:

processing circuitry to process vector instructions wherein:

in response to a given vector instruction, the processing circuitry is configured to perform a plurality of beats of processing, each beat comprising processing corresponding to a portion of a vector value comprising a plurality of elements;

wherein the vector value is a source operand or a result value of the given vector instruction;

the processing circuitry is configured to set beat status information specifying which beats of a plurality of vector instructions including said given vector instruction have completed;

wherein an encoding of the beat status information identifies a first number of completed beats of said given vector instruction and a second number of completed beats of a subsequent vector instruction in the plurality of vector instructions, wherein both the first number and the second number are variable and both the first number and the second number are identified by the encoding of the beat status information;

in response to an event, the processing circuitry is configured to suspend processing of said given vector instruction; and in response to a return-from-event request indicating a return to processing of one of said plurality of vector instructions, the processing circuitry is configured to resume processing of said plurality of vector instructions while suppressing the beats of said plurality of vector instructions indicated by said beat status information as having completed;

the vector value comprises data elements having one of a plurality of data element sizes specified by data element size information accessible to the processing circuitry; and each beat of processing comprises processing corresponding to a fixed size portion of the vector value, independent of the data element size indicated by said data element size information.

(2) The apparatus according to clause (1), wherein the processing circuitry is configured to set a return address indicating an address of one of said plurality of vector instructions; and in response to the return-from-event request, the processing circuitry is configured to identify a point from which processing is to be resumed based on the return address and said beat status information.

(3) The apparatus according to clause (2), wherein the return address indicates an address of an oldest vector instruction for which at least one beat is still to be completed.

(4) The apparatus according to any preceding clause, wherein the plurality of vector instructions comprise an oldest vector instruction for which at least one beat is still to be completed and at least one subsequent vector instruction.

(5) The apparatus according to any preceding clause, wherein the processing circuitry comprises hardware insufficient for performing all of the plurality of beats of the given vector instruction in parallel.

(6) The apparatus according to any preceding clause, wherein in response to the given vector instruction, the processing circuitry is configured to perform a second subset of the plurality of beats of processing after completing a first subset of the plurality of beats of processing.

(7) The apparatus according to clause (6), wherein the processing circuitry is configured to perform the second subset of beats for a first vector instruction in parallel with performing the first subset of beats for a second vector instruction.

(8) The apparatus according to any preceding clause, comprising control circuitry to vary, from instruction to instruction, how many beats of one vector instruction are to be completed before commencing a first beat of a following vector instruction.

(9) The apparatus according to any of clauses (1) to (4), (6) and (7), wherein in response to the given vector instruction, the processing circuitry comprises hardware configured to support performing all of the plurality of beats of processing in parallel.

(10) The apparatus according to any preceding clause, wherein the vector value comprises data elements having one of a plurality of data element sizes specified by data element size information accessible to the processing circuitry; and each beat of processing comprises processing corresponding to a fixed size portion of the vector value, irrespective of the data element size indicated by said data element size information.

(11) The apparatus according to any preceding clause, wherein the processing circuitry is configured to make said beat status information accessible to at least one of software executed by the processing circuitry, an exception handler and a debugger.

(12) The apparatus according to any preceding clause, wherein said event comprises a debug event, and said return-from-event request comprises a return from a debug state.

(13) The apparatus according to any preceding clause, wherein said event comprises an exception event, and said return-from-event request comprises an exception return.

(14) The apparatus according to clause (13), wherein said exception event comprises a fault event, and in response to said fault event the processing circuitry is configured to set information identifying which of said plurality of vector instructions is said given vector instruction for which said fault event was detected.

(15) The apparatus according to any of clauses (13) and (14), wherein in response to the exception event, said processing circuitry to configured to disable access to said beat status information; and in response to an instruction that attempts to access said beat status information, or in response to execution of at least one type of further vector instruction comprising a plurality of beats of processing, said processing circuitry is configured to:

save said beat status information to a predetermined location; or raise a second exception event.

(16) The apparatus according to any of clauses (13) and (14), wherein in response to the exception event, the processing circuitry is configured to save the beat status information to a location in a data store at an offset relative to a value indicated by a stack pointer register.

(17) The apparatus according to clause (16), wherein said processing circuitry is operable in a plurality of security states including at least a secure and a less secure state, wherein in response to the exception event causing a transition from said secure state to said less secure state, the processing circuitry is configured to clear the beat status information.

(18) The apparatus according to any preceding clause, wherein the processing circuitry is configured to suppress a given beat of processing by one of:

suppressing updating of a portion of a destination vector register corresponding to said given beat of processing; and suppressing a processing operation associated with said given beat of processing.

(19) An apparatus comprising:

means for processing vector instructions for which at least one of a source operand and a result value is a vector value comprising a plurality of data elements;

wherein in response to a given vector instruction, the means for processing is configured to perform a plurality of beats of processing, each beat comprising processing corresponding to a portion of the vector value;

the means for processing is configured to set beat status information indicative of which beats of a plurality of vector instructions including said given vector instruction have already completed; and in response to an event, the means for processing is configured to suspend processing of said given vector instruction; and in response to a return-from-event request indicating a return to processing of one of said plurality of vector instructions, the means for processing is configured to resume processing of said plurality of vector instructions while suppressing the beats of said plurality of vector instructions indicated by said beat status information as having completed.

(20) A method of processing vector instructions, the method comprising:

in response to a given vector instruction, performing a plurality of beats of processing, each beat comprising processing corresponding to a portion of the vector value comprising a plurality of elements;

wherein the vector value is a source operand or a result value of the given vector instruction;

setting beat status information indicative of which beats of a plurality of vector instructions including said given vector instruction have already completed, wherein an encoding of the beat status information identifies a first number of completed beats of said given vector instruction and a second number of completed beats of a subsequent vector instruction subsequent to the given vector instruction in the plurality of vector instructions, wherein both the first number and the second number are variable and both the first number and the second number are identified by the encoding of the beat status information; and in response to an event, suspending processing of said given vector instruction; and in response to a return-from-event request indicating a return to processing of said given vector instruction, resuming processing of said plurality of vector instructions while suppressing the beats of said plurality of vector instructions indicated by said beat status information as having completed;

wherein the vector value comprises data elements having one of a plurality of data element sizes specified by data element size information; and each beat of processing comprises processing corresponding to a fixed size portion of the vector value, independent of the data element size indicated by said data element size information.

(21) A virtual machine computer program comprising program instructions to control a host data processing apparatus to provide an instruction execution environment corresponding to the apparatus according to any of clauses (1) to (18).

(22) An apparatus comprising:

processing circuitry to process vector instructions specifying one or more source registers and a destination register, wherein at least one of said destination register and said one or more source registers is a vector register for storing a vector value comprising a plurality of data elements;

wherein the vector instructions include at least one type of mixed-scalar-vector instruction for which another of said destination register and said one or more source registers is a scalar register for storing a scalar value comprising a single data element;

in response to a given vector instruction, the processing circuitry is configured to perform a plurality of beats of processing, each beat comprising processing corresponding to a portion of the vector value;

the processing circuitry is configured to support overlapped execution of a first vector instruction and a second vector instruction in which at least one beat of the first vector instruction is performed in parallel with at least one beat of the second vector instruction; and in response to a sequence of instructions comprising a first mixed-scalar-vector instruction specifying a first scalar register and a subsequent mixed-scalar-vector instruction specifying a second scalar register, with fewer than a predetermined number of intervening instructions between the first and subsequent mixed-scalar-vector instructions, said processing circuitry is configured to support relaxed execution comprising at least one of the following:

where said first scalar register is a source register and said second scalar register is a destination register, the processing circuitry is configured to permit said overlapped execution of said first and subsequent mixed-scalar-vector instructions to generate a result of said first mixed-scalar-vector instruction which differs depending on whether the second scalar register is the same register as said first scalar register; and where said first scalar register is a destination register and said second scalar register is a source register and said first scalar register and said second scalar register are the same register, said processing circuitry is configured to permit said overlapped execution of said first and subsequent mixed-scalar-vector instructions to generate a result of said second mixed-scalar-vector instruction which differs depending on a number of intervening instructions between the first and subsequent mixed-scalar-vector instructions.

(23) The apparatus according to clause (22), wherein at least one of said first and subsequent mixed-scalar-vector instructions is an arithmetic instruction.

(24) The apparatus according to any of clauses (22) and (23), wherein processing circuitry is configured to support processing of a plurality of different classes of mixed-scalar-vector instruction; and the processing circuitry is configured to prevent said relaxed execution of the first subsequent mixed-scalar-vector instructions when the first and subsequent mixed-scalar-vector instructions are both from the same class of mixed-scalar-vector instruction.

(25) The apparatus according to clause (24), wherein the processing circuitry is configured to prevent said relaxed execution by preventing said overlapped execution of said first and subsequent mixed-scalar-vector instructions.

(26) The apparatus according to any of clauses (24) and (25), wherein where said first scalar register is the source register and said second scalar register is the destination register the processing circuitry is configured to prevent said relaxed execution by copying a scalar value from the first scalar register to a third scalar register and executing at least one beat of said first mixed-scalar-vector instruction using said third scalar register as the source register instead of said first scalar register.

(27) The apparatus according to any of clauses (24) to (26), wherein the processing circuitry is configured to process mixed-scalar-vector-instructions from the same class using the same hardware circuit unit.

(28) The apparatus according to clause (27), wherein the processing circuitry to process mixed-scalar-vector instructions from at least some different classes using different hardware circuit units.

(29) The apparatus according to any of clauses (24) to (28), wherein the plurality of classes of mixed-scalar-vector-instruction include at least:
a first class comprising at least a load instruction; and
a second class comprising at least an instruction that performs a multiply.

(30) The apparatus according to any of clause (24) to (29), wherein the plurality of classes of mixed-scalar-vector-instruction include at least:
a first class comprising at least memory access instructions;
a second class comprising at least an instruction that performs a multiply; and
at least one of:
a third class comprising at least a non-multiply arithmetic instruction; and
a fourth class comprising at least a floating-point instruction.

(31) The apparatus according to any of clauses (22) to (30), wherein the processing circuitry is configured to prevent said relaxed execution of said first and subsequent mixed-scalar-vector instructions when an intervening instruction between said first and subsequent mixed-scalar-vector instruction is an overlap barrier instruction.

(32) The apparatus according to clause (31), wherein where said first scalar register is the source register and said second scalar register is the destination register the processing circuitry is configured to prevent said relaxed execution by copying a scalar value from the first scalar register to a third scalar register and execute at least one beat of said first mixed-scalar-vector instruction using said third scalar register as the source register instead of said first scalar register.

(33) The apparatus according to any of clauses (31) and (32), wherein the processing circuitry is configured to execute said overlap barrier instruction as at least one no-op operation.

(34) The apparatus according to any of clauses (22) to (33), wherein in response to a mixed-scalar-vector instruction for which said scalar register is one of said source registers, the processing circuitry is configured to perform each of said plurality of beats of processing dependent on the scalar value in said scalar register.

(35) The apparatus according to any of clauses (22) to (34), wherein in response to a mixed-scalar-vector instruction for which said scalar register is the destination register, a scalar result value to be written to said scalar register is dependent on an outcome of each of said plurality of beats of processing.

(36) The apparatus according to any of clauses (22) to (35), wherein for at least one type of mixed-scalar-vector instruction, said scalar register is both a source register and a destination register.

(37) The apparatus according to any of clauses (22) to (36), wherein the processing circuitry comprises hardware insufficient for performing all of the plurality of beats of the given vector instruction in parallel.

(38) The apparatus according to any of clauses (22) to (37), wherein in said overlapped execution, the processing circuitry is configured to perform a first subset of beats of said second vector instruction in parallel with a second subset of beats of said first vector instruction.

(39) The apparatus according to any of clauses (22) to (38), wherein said plurality of beats of processing comprise $2^J$ beats of processing, where J is an integer greater than or equal to 1;
in said overlapped execution, the processing circuitry is configured to perform a first beat of said second vector instruction in parallel with a $(2K+1)^{th}$ beat of said first vector instruction, where K is an integer and $0 \leq K < J$; and
said predetermined number of intervening instructions comprises $(2^{(J-K)}-1)$.

(40) The apparatus according to any of clauses (22) to (39), wherein the vector value comprises data elements having one of a plurality of data element sizes specified by data element size information accessible to the processing circuitry; and each beat of processing comprises processing corresponding to a fixed size portion of the vector value, irrespective of the data element size indicated by said data element size information.

(41) An apparatus comprising:
means for processing vector instructions specifying one or more source registers and a destination register, wherein at least one of said destination register and said one or more source registers is a vector register for storing a vector value comprising a plurality of data elements;
wherein the vector instructions include at least one type of mixed-scalar-vector instruction for which another of said destination register and said one or more source registers is a scalar register for storing a scalar value comprising a single data element;
in response to a given vector instruction, the means for processing is configured to perform a plurality of beats of processing, each beat comprising processing corresponding to a portion of the vector value;
the means for processing is configured to support overlapped execution of a first vector instruction and a second vector instruction in which at least one beat of the first vector instruction is performed in parallel with at least one beat of the second vector instruction; and
in response to a sequence of instructions comprising a first mixed-scalar-vector instruction specifying a first scalar register and a subsequent mixed-scalar-vector instruction specifying a second scalar register, with fewer than a predetermined number of intervening instructions between the first and subsequent mixed-scalar-vector instructions, said means for processing is configured to support relaxed execution comprising at least one of the following:
where said first scalar register is a source register and said second scalar register is a destination register, the means for processing is configured to permit said overlapped execution of said first and subsequent mixed-scalar-vector instructions to generate a result of said first mixed-scalar-vector instruction which differs depending on whether the second scalar register is the same register as said first scalar register; and where said first scalar register is a destination register and said second scalar register is a source register and said first scalar register and said second scalar register are the same register, said means for processing is configured to permit said overlapped execution of said first and subsequent mixed-scalar-vector instructions to generate a result of said second mixed-scalar-vector instruction which differs depending on a number of intervening instructions between the first and subsequent mixed-scalar-vector instructions.

(42) A virtual machine computer program comprising program instructions to control a host data processing apparatus to provide an instruction execution environment corresponding to the apparatus according to any of clauses (22) to (40).

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to process vector instructions wherein:
in response to a given vector instruction, the processing circuitry is configured to perform a plurality of beats of processing, each beat comprising processing corresponding to a portion of a vector value comprising a plurality of elements;
the vector value is a source operand or a result value of the given vector instruction;
the processing circuitry is configured to set beat status information specifying which beats of a plurality of vector instructions including said given vector instruction have completed;
an encoding of the beat status information identifies a first number of completed beats of said given vector instruction and a second number of completed beats of a subsequent vector instruction in the plurality of vector instructions, wherein both the first number and the second number are variable and both the first number and the second number are identified by the encoding of the beat status information;
in response to an event, the processing circuitry is configured to suspend processing of said given vector instruction;
in response to a return-from-event request indicating a return to processing of one of said plurality of vector instructions, the processing circuitry is configured to resume processing of said plurality of vector instructions while suppressing the beats of said plurality of vector instructions indicated by said beat status information as having completed;
the vector value comprises data elements having one data element size, of a plurality of sizes, specified by data element size information accessible to the processing circuitry; and
each beat of processing comprises processing corresponding to a fixed size portion of the vector value, independent of the data element size specified by said data element size information.

2. The apparatus according to claim 1, wherein the processing circuitry is configured to set a return address indicating an address of one of said plurality of vector instructions; and
in response to the return-from-event request, the processing circuitry is configured to identify a point from which processing is to be resumed based on the return address and said beat status information.

3. The apparatus according to claim 2, wherein the return address indicates an address of an oldest vector instruction for which at least one beat is still to be completed.

4. The apparatus according to claim 1, wherein the plurality of vector instructions comprise an oldest vector instruction for which at least one beat is still to be completed and at least one subsequent vector instruction.

5. The apparatus according to claim 1, wherein in response to the given vector instruction, the processing circuitry is configured to perform a second subset of the plurality of beats of processing after completing a first subset of the plurality of beats of processing.

6. The apparatus according to claim 5, wherein the processing circuitry is configured to perform the second subset of beats for a first vector instruction in parallel with performing the first subset of beats for a second vector instruction.

7. The apparatus according to claim 1, comprising control circuitry to vary, from instruction to instruction, how many beats of one vector instruction are to be completed before commencing a first beat of a following vector instruction.

8. The apparatus according to claim 1, wherein in response to the given vector instruction, the processing circuitry comprises hardware insufficient for performing all of the plurality of beats of processing in parallel.

9. The apparatus according to claim 1, wherein in response to the given vector instruction, the processing circuitry comprises hardware configured to support performing all of the plurality of beats of processing in parallel.

10. The apparatus according to claim 1, wherein the processing circuitry is configured to make said beat status information accessible to at least one of software executed by the processing circuitry, an exception handler and a debugger.

11. The apparatus according to claim 1, wherein said event comprises a debug event, and said return-from-event request comprises a return from a debug state.

12. The apparatus according to claim 1, wherein said event comprises an exception event, and said return-from-event request comprises an exception return.

13. The apparatus according to claim 12, wherein said exception event comprises a fault event, and in response to said fault event the processing circuitry is configured to set information identifying which of said plurality of vector instructions is said given vector instruction for which said fault event was detected.

14. The apparatus according to claim 12, wherein in response to the exception event, said processing circuitry to configured to disable access to said beat status information; and in response to an instruction that attempts to access said beat status information, or in response to execution of at least one type of further vector instruction comprising a plurality of beats of processing, said processing circuitry is configured to:
- save said beat status information to a predetermined location; or
- raise a second exception event.

15. The apparatus according to claim 12, wherein in response to the exception event, the processing circuitry is configured to save the beat status information to a location in a data store at an offset relative to a value indicated by a stack pointer register.

16. The apparatus according to claim 15, wherein said processing circuitry is operable in a plurality of security states including at least a secure and a less secure state, wherein in response to the exception event causing a transition from said secure state to said less secure state, the processing circuitry is configured to clear the beat status information.

17. The apparatus according to claim 1, wherein the processing circuitry is configured to suppress a given beat of processing by one of:
- suppressing updating of a portion of a destination vector register corresponding to said given beat of processing; and
- suppressing a processing operation associated with said given beat of processing.

18. The apparatus according to claim 1 wherein the beat status information has at least a first encoding, a second encoding and a third encoding,
- wherein the first encoding and the second encoding specify different numbers of completed beats for the given vector instruction and specify the same number of completed beats for the subsequent vector instruction, and
- the second encoding and the third encoding specify the same number of completed beats for the given vector instructions but specify different numbers of completed beats for the subsequent vector instruction.

19. A method of processing vector instructions, the method comprising:
- in response to a given vector instruction, performing a plurality of beats of processing, each beat comprising processing corresponding to a portion of a vector value comprising a plurality of elements;
- wherein the vector value is a source operand or a result value of the given vector instruction;
- setting beat status information, indicative of which beats of a plurality of vector instructions including said given vector instruction have completed, wherein an encoding of the beat status information identifies a first number of completed beats of said given vector instruction and a second number of completed beats of a subsequent vector instruction subsequent to the given vector instruction in the plurality of vector instructions, wherein both the first number and the second number are variable and both the first number and the second number are identified by the encoding of the beat status information;
- in response to an event, suspending processing of said given vector instruction; and
- in response to a return-from-event request indicating a return to processing of one of said plurality of vector instructions, resuming processing of said plurality of vector instructions while suppressing the beats of said plurality of vector instructions indicated by said beat status information as having completed;
- wherein the vector value comprises data elements having one data element size, of a plurality of sizes, specified by data element size information; and
- each beat of processing comprises processing corresponding to a fixed size portion of the vector value, independent of the data element size specified by said data element size information.

20. A non-transitory storage medium storing a virtual machine computer program comprising program instructions to control a host data processing apparatus to provide an instruction execution environment corresponding to the apparatus according to claim 1.

* * * * *